Apr. 10, 1923.   1,451,419

T. O. DILLS

DIRIGIBLE HEADLIGHT

Filed Oct. 17, 1921   2 sheets-sheet 1

Inventor
Thomas O. Dills

By Townshend & Townshend
Attorney

Apr. 10, 1923.
T. O. DILLS
1,451,419
DIRIGIBLE HEADLIGHT
Filed Oct. 17, 1921
2 sheets-sheet 2
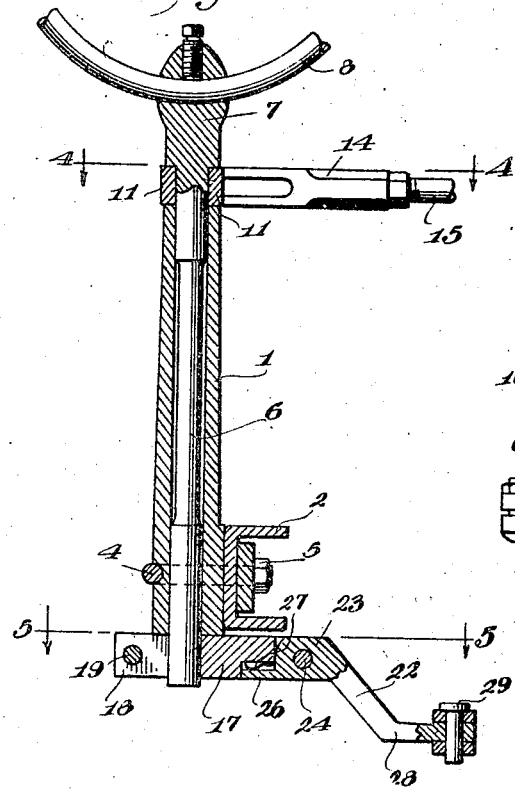
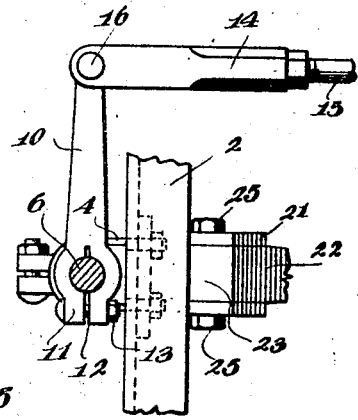
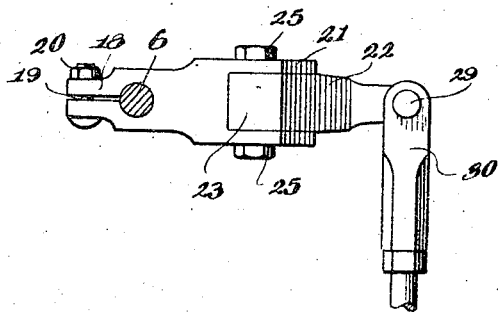
Inventor
Thomas O. Dills
By Townshend + Townshend
Attorney Patented Apr. 10, 1923.

1,451,419

UNITED STATES PATENT OFFICE.

THOMAS O. DILLS, OF BATESVILLE, MISSISSIPPI.

DIRIGIBLE HEADLIGHT.

Application filed October 17, 1921. Serial No. 508,196.

*To all whom it may concern:*

Be it known that I, THOMAS O. DILLS, a citizen of the United States, and residing at Batesville, in the county of Panola and State of Mississippi, have invented certain new and useful Improvements in a Dirigible Headlight, of which the following is a specification.

My invention relates to an apparatus for controlling the head-lights of an automobile whereby the same will be moved in the direction of the front wheels.

The principal object of the invention is to provide a dirigible head-light constructed on a novel manner, and which is designed to take up all shocks incident to road travel, without in any way affecting the head-lights by any undue vibration.

With these and such other objects in view as will be apparent from the description, my invention resides in the novel combination, constructions and arrangement of parts hereinafter described and claimed, and taken in connection with the accompanying drawings, in which—

Figure 1:
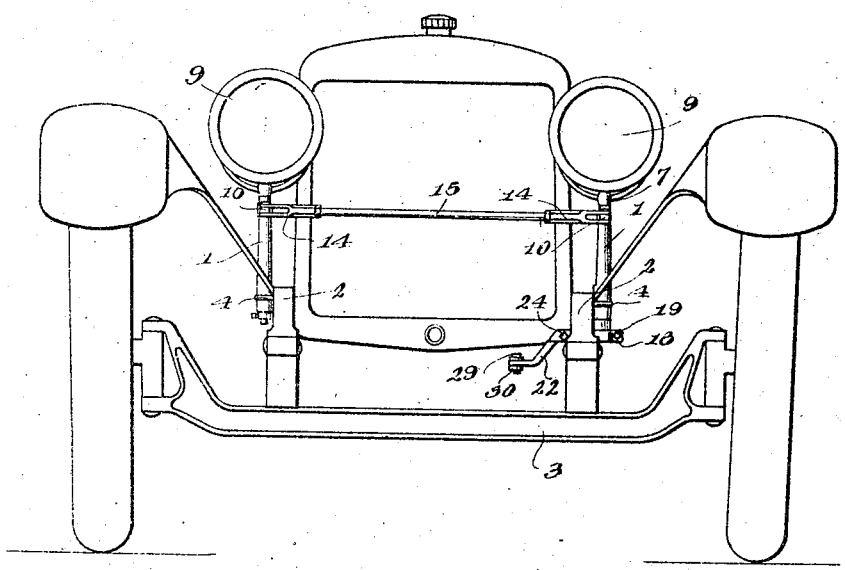
Figure 2:
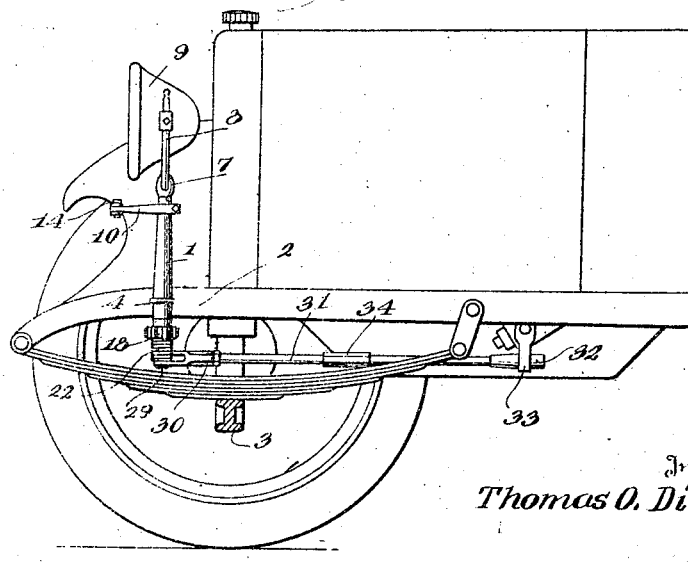

Figure 1 is a front elevation of an automobile equipped with my invention;

Figure 2, a side elevation of the front thereof;

Figure 3, a vertical section through one of the lamp members;

Figure 4, a horizontal section on the line 4—4 of Figure 3; and

Figure 5, a horizontal section on the line 5—5 of Figure 3.

In detail, the invention comprises a pair of hollow tubular lamp spindle casings 1 secured on each side of the chassis 2 and forwardly of the front axle 3 of an automobile, by means of U-bolts 4 extending into the channeled portion of the chassis bars 2 and secured therein by suitable nuts or other fastening members 5. These lamp spindle casings are disposed in a vertical position and carry therein the lamp spindle members 6 adapted for free rotation within the casings and provided at their upper ends with enlarged heads 7 suitably bored to receive therethrough horns 8 for carrying the lamps 9. Each of the lamp spindles 6 is connected with a forwardly extending lateral arm 10, by means of the spring clamp formed by longitudinal slot in one end of the arms, nereby to provide in effect spring arms 11 formed to engage the spindle 6 and adapted to be clamped thereon by means of the clamping bolt 12 and nut 13. The arms 11 are disposed beneath the enlarged head of each of the lamp spindles and rest on the tops of the casings 1 whereby the lamp spindles will be supported within the casings, and the outer ends of the arms 10 are connected by means of clevis members 14 with the rod 15 extending across the front of the vehicle for simultaneous operation of the lights, the connection between the clevis members 14 and the arms 10 being secured by a pivot pin 16.

The lamp spindles 6, adjacent the side of the frame in which the steering mechanism is disposed, extends below the bottom of its casing 1 and carries thereon a laterally extending member 17 formed at one end with spring clamping arms 18 through which are passed the bolt 19, having threaded thereon a clamping nut 20 for clamping the member rigidly on the lower end of the spindle, as clearly illustrated in Figure 3. The opposite end of the member 17 is bifurcated to provide arms 21 between which is disposed a plate 22 having its upper end 23 normally arranged in the plane of the member 17 and pivoted thereon a pivot member 24 extending therethrough and journaled in the arms 21, this member 24 being secured in the arms by means of the retaining nuts 25. The end portion of the member 23, which is disposed between the arms 21, is provided with a lip 26 extending into a recess formed in the adjacent end of the member 17 and suitably secured in the recess 17 is a leaf spring 27 arranged to act between the member 17 and lip 26 to provide in effect a spring hinge at this point of the mechanism. Beyond the arms 21 the plate 22 is inclined downwardly and is provided with a horizontally extending lower end 28 connected by means of a pivot pin 29 with the clevis member 30 carried on the forward end of the rod 31, which is connected at its rear end by means of the ball and socket joint 32 with the steering arm 33 carried by the automobile. An adjusting joint 34 is arranged in the rod 31 for regulating the throw of the lights as desired.

In operation, as the steering arm 33 is actuated, the rod 31 will be moved longitudinally and act on the hinge mechanism comprising the plate 22 and member 16, thus causing the adjacent lamp spindle 6 to be turned within its casing, whereupon the other lamp spindle will be similarly turned due to the connection 15 as described, and the lamps will be turned in the direction of the front wheels of the machine. The spring tension of the horizontal hinge arrangement, secured by the spring 27, will take up any play in the mechanism due to shocks encountered by irregularities in the road surface and undue vibration will be prevented from being transmitted to the members comprising the lamp supports.

While I have illustrated and described certain details and materials which enter into the construction and operation of my invention, I desire it to be understood that I do not intend to limit myself to these, but that any such may be used as will fall within the scope of the invention as claimed.

I claim:

In a device of the character described, the combination of a pair of lamp spindle casings secured to the frame of an automobile, having rotatably connected lamp spindles mounted therein, of a laterally and inwardly extending member with respect to the frame of the automobile, secured to the lower end of one of said spindles, the outer end of said member being bifurcated and notched on its under face at the inner edge of said bifurcation, an inclined connecting plate in the same vertical plane with said member having its upper and lower ends extending parallel and outwardly in different horizontal planes, the upper end of said plate being mounted on a horizontal pivot between the bifurcations of said member, a forwardly extending lip on said end adapted to be positioned in the recess in said member, a bent spring disposed within said recess and engaged by said lip, and the lower end of said plate having a right angular pivotal connection with the steering mechanism of the automobile.

In testimony whereof I affix my signature.

THOMAS O. DILLS.